United States Patent
Li et al.

(10) Patent No.: US 11,323,807 B2
(45) Date of Patent: May 3, 2022

(54) ECHO CANCELLATION METHOD AND APPARATUS BASED ON TIME DELAY ESTIMATION

(71) Applicant: IFLYTEK CO., LTD., Anhui (CN)

(72) Inventors: Mingzi Li, Anhui (CN); Feng Ma, Anhui (CN); Haikun Wang, Anhui (CN); Zhiguo Wang, Anhui (CN); Guoping Hu, Anhui (CN)

(73) Assignee: IFLYIEK CO., LTD., Anhui (CN)

( * ) Notice: Subject to any disclaimer, the term of this patent is extended or adjusted under 35 U.S.C. 154(b) by 15 days.

(21) Appl. No.: 16/756,967

(22) PCT Filed: Jul. 16, 2018

(86) PCT No.: PCT/CN2018/095759
§ 371 (c)(1),
(2) Date: Apr. 17, 2020

(87) PCT Pub. No.: WO2019/080552
PCT Pub. Date: May 2, 2019

(65) Prior Publication Data
US 2021/0051404 A1    Feb. 18, 2021

(30) Foreign Application Priority Data
Oct. 23, 2017    (CN) .......................... 201710994195.X (51) Int. Cl.
*H04R 3/04*     (2006.01)
*G10L 21/0232*  (2013.01)
(Continued)

(52) U.S. Cl.
CPC ............ *H04R 3/04* (2013.01); *G10L 21/0232* (2013.01); *H04R 29/004* (2013.01); *G10L 2021/02082* (2013.01); *G10L 2021/02163* (2013.01)

(58) Field of Classification Search
CPC ........ H04R 3/04; H04R 29/004; H04R 3/005; H04R 3/02; H04R 1/406; H04R 1/222;
(Continued)

(56) References Cited

U.S. PATENT DOCUMENTS 6,968,352 B1 *  11/2005  Gilloire .................. H04M 9/082
                                                    708/300
7,792,281 B1 *   9/2010  Zad-Issa ............... H04M 9/082
                                                    379/406.04
(Continued)

FOREIGN PATENT DOCUMENTS

CN          1691716 A      11/2005
CN        103700374 A       4/2014
(Continued)

OTHER PUBLICATIONS

Japanese Office Action received in Application No. 2020-517351, dated May 18, 2021, pp. 5.
(Continued)

*Primary Examiner* — Akelaw Teshale
(74) *Attorney, Agent, or Firm* — Zhong Law, LLC (57) ABSTRACT

An echo cancellation method based on delay estimation is provided. In the method, a microphone signal and a reference signal are received and preprocessed. In the preprocessed microphone signal and the preprocessed reference signal, frequency point signals with non-linearity in a current echo cancellation scenario are determined. A current delay estimation value is calculated based on frequency point signals without non-linearity in the microphone signal and the reference signal. The reference signal is shifted based on the current delay estimation value. An adaptive filter is updated based on the preprocessed microphone signal and the shifted reference signal, to perform echo cancellation.

19 Claims, 4 Drawing Sheets

(51) Int. Cl.
*H04R 29/00* (2006.01)
*G10L 21/0208* (2013.01)
*G10L 21/0216* (2013.01)

(58) Field of Classification Search
CPC ............ H04R 2430/25; H04R 2430/23; H04R 2499/13; H04R 29/002; H04R 3/00; H04R 3/12; G10L 21/0232; G10L 2021/02082; G10L 2021/02163; G10L 21/0216; G10L 21/0208; H04M 9/082
See application file for complete search history.

(56) References Cited

U.S. PATENT DOCUMENTS

| | | | |
|---|---|---|---|
| 9,437,210 B2 * | 9/2016 | Hammarqvist | H04R 3/04 |
| 9,508,359 B2 * | 11/2016 | Gao | H04M 9/082 |
| 2004/0081315 A1 | 4/2004 | Boland et al. | |
| 2012/0063610 A1 | 3/2012 | Kaulberg et al. | |
| 2014/0126745 A1 * | 5/2014 | Dickins | H04R 3/02 381/94.3 |
| 2014/0355752 A1 * | 12/2014 | Sorensen | H04M 3/002 379/406.06 |
| 2015/0154977 A1 * | 6/2015 | Ekman | G10K 11/175 381/66 |
| 2016/0127527 A1 | 5/2016 | Mani et al. | |
| 2016/0225385 A1 * | 8/2016 | Hammarqvist | G10L 21/0208 |
| 2019/0027160 A1 * | 1/2019 | Liang | H04R 3/04 |

FOREIGN PATENT DOCUMENTS

| | | |
|---|---|---|
| CN | 105472191 A | 4/2016 |
| CN | 105825864 A | 8/2016 |
| CN | 105872156 A | 8/2016 |
| CN | 106033673 A | 10/2016 |
| CN | 106847299 A | 6/2017 |
| CN | 107610713 A | 1/2018 |
| JP | 2004-282700 A | 10/2004 |
| JP | 2010072460 A | 4/2010 |
| JP | 2013-012841 A | 1/2013 |
| JP | 2016-025471 A | 2/2016 |
| KR | 20040036669 A | 4/2004 |

OTHER PUBLICATIONS

Chinese Office Action issued in Chinese Application No. 201710994195.X dated May 18, 2020, 12 pages.
Extended European Search Report issued in European Application No. 18869573.8 dated Mar. 25, 2021, 7 pages.
Korean Office Action issued in Korean Application No. 10-2020-7014264 dated Mar. 9, 2021, 15 pages.
International Search Report and the Written Opinion issued in PCT/CN2018/095759 dated Oct. 12, 2018, 17 pages.

* cited by examiner

ECHO CANCELLATION METHOD AND APPARATUS BASED ON TIME DELAY ESTIMATION

The present application is the national phase of International Patent Application No. PCT/CN2018/095759, titled "ECHO CANCELLATION METHOD AND APPARATUS BASED ON TIME DELAY ESTIMATION", filed on Jul. 16, 2018, which claims priority to Chinese Patent Application No. 201710994195.X, titled "ECHO CANCELLATION METHOD AND APPARATUS BASED ON TIME DELAY ESTIMATION", filed on Oct. 23, 2017 with the Chinese Patent Office, both of which are incorporated herein by reference in their entireties.

FIELD

The present disclosure relates to the field of signal processing, and in particular to an echo cancellation method based on delay estimation and an echo cancellation apparatus based on delay estimation.

BACKGROUND

With the continuous development of information technology, various kinds of distributed smart hardware are increasingly used in various application fields. Echo cancellation is necessary in interaction with smart devices, which is a hot research topic in the art.

Echo cancellation is a processing that cancels or removes a far-end sound signal picked up by a local microphone in order to preventing the return of the far-end sound signal back to the far-end. A typical current echo cancellation scheme is based on delay estimation in which a linear correlation between a reference signal and a microphone signal is calculated. A delay corresponding to a maximum cross-correlation is selected as a device delay. The reference signal is shifted based on the device delay. An adaptive filter is updated based on the shifted reference signal and the microphone signal, to generate a signal approximating a real echo. The signal approximating the real echo is subtracted from the microphone signal, so as to achieve echo cancellation. In real applications, a distributed smart hardware apparatus with only self-operation authorization cannot synchronously resample the reference signal and the microphone signal. For example, in a normal home, a television box is used to control a television. The television box and the television are normally provided by different manufacturers. Assume that a manufacturer of the television box that designs the sound control function of the television box wants to perform echo cancellation of a sound played by the television, but only has the operation authorization of the television box. In this situation, the television box can only acquire a source signal transmitted by the television box to the television and a signal collected by a microphone of the television box. In this case, the source signal transmitted by the television box to the television serves as the reference signal. The signal collected by the microphone of the television box serves as the microphone signal. The television box cannot synchronously resample the speaker signal and the microphone signal. Therefore, a delay between the reference signal and the microphone signal needs to be estimated, so as to achieve echo cancellation based on the delay.

Therefore, whether the delay estimation is accurate or not directly affects the effect of echo cancellation. Due to complex and changeable environment in practical applications, a large error occurs in a delay estimation value acquired with the conventional estimate-based echo cancellation technology. Therefore, there is a need to improve the effect of echo cancellation.

SUMMARY

An echo cancellation method based on delay estimation and an echo cancellation apparatus based on delay estimation are provided according to embodiments of the present disclosure, so as to reduce an error of delay estimation and improve an effect of echo cancellation.

Therefore, the following technical solutions are provided according to the present disclosure.

An echo cancellation method based on delay estimation includes: receiving a microphone signal and a reference signal, and preprocessing the microphone signal and the reference signal; determining, in the preprocessed microphone signal and the preprocessed reference signal, frequency point signals with non-linearity in a current echo cancellation scenario; calculating a current delay estimation value based on the frequency point signals without non-linearity in the microphone signal and the reference signal; shifting the reference signal based on the current delay estimation value; and updating an adaptive filter based on the preprocessed microphone signal and the shifted reference signal, to perform echo cancellation.

In an embodiment, the determining, in the preprocessed microphone signal and the preprocessed reference signal, frequency point signals with non-linearity in a current echo cancellation scenario includes one or more of a far-end signal detection, a dual-end signal detection, and a detection of non-linearity caused by device hardware. In the far-end signal detection, the frequency point signals with non-linearity are determined based on one or more of energy, a zero-crossing rate, and a short-term amplitude of the preprocessed reference signal. In the dual-end signal detection, the frequency point signals with non-linearity are determined based on a ratio of energy of the preprocessed microphone signal to energy of the preprocessed reference signal. In the detection of non-linearity caused by device hardware, first, a mean value of correlation between the reference signal and the microphone signal in a low frequency range is calculated. Then, mean values of correlation between the reference signal and the microphone signal in other frequency ranges at a predetermined frequency interval are calculated. Finally, the frequency point signals with non-linearity are determined based on the mean values of correlation in the other frequency ranges and the mean value of correlation in the low frequency range.

In an embodiment, the calculating a current delay estimation value based on frequency point signals without non-linearity in the microphone signal and the reference signal includes: for each of frames of the microphone signal in a delay analysis range, selecting the frequency point signals without non-linearity in the reference signal and the frame of the microphone signal, and calculating a cross-correlation value between the reference signal and the frame of the microphone signal; and determining the delay estimation value based on calculated cross-correlation values between the reference signal and the frames of the microphone signal.

In an embodiment, the determining the delay estimation value based on calculated cross-correlation values between the reference signal and the frames of the microphone signal includes: selecting a position corresponding to a frame of the microphone signal with a maximum cross-correlation value among the calculated cross-correlation values between the reference signal and the frames of the microphone signal as a current delay position; and determining the current delay estimation value based on the current delay position and a position of the reference signal.

In an embodiment, the determining the current delay estimation value based on calculated cross-correlation values between the reference signal and the frames of the microphone signal includes: selecting, in each delay estimation, a position corresponding to a frame of the microphone signal with a maximum cross-correlation value among the calculated cross-correlation values between the reference signal and the frames of the microphone signal in the delay analysis range as a candidate delay position; and mapping candidate delay positions into an L-dimensional array Sa, wherein L is equal to a total number of frames of the microphone signal in the delay analysis range, and counting the number of times that a candidate delay position repeatedly appears; increasing a value for a current candidate delay position by a first preset value t1, decreasing a value for a previous candidate delay position by a second preset value t2, and decreasing values for other positions by a third preset value t3, if the current candidate delay position is changed; increasing the value for the current candidate delay position by the first preset value t1, and decreasing values for other positions by the third preset value t3, if the current candidate delay position is not changed, where the second preset value t2 is less than or equal to the third preset value t3; and determining the current delay estimation value based on the current candidate delay position and a position of the reference signal, if the value for the current candidate delay position is greater than a first threshold and the number of times that the current candidate delay position repeatedly appears is greater than a second threshold.

In an embodiment, the shifting the reference signal based on the current delay estimation value includes: not shifting data of the reference signal in a case that the current delay estimation value $D_1(t)$ is less than or equal to a third threshold T3; shifting the data of the reference signal by $D_1(t)/2$ in a case that the current delay estimation value $D_1(t)$ is greater than the third threshold T3 and less than a fourth threshold T4; and shifting the data of the reference signal by $D_1(t)$ in a case that the current delay estimation value $D_1(t)$ is greater than or equal to the fourth threshold T4.

In an embodiment, the determining the delay estimation value based on calculated cross-correlation values between the reference signal and the frames of the microphone signal includes determining that one or more of the following conditions are met: (1) a cross-correlation value C(t) corresponding to a current delay position is greater than a cross-correlation value C(t−1) corresponding to a previous delay position; (2) for each frame in a current delay analysis range, a difference between a position corresponding to a maximum cross-correlation value $C_{max}(t)$ and a position corresponding to a minimum cross-correlation $C_{min}(t)$ is greater than a first preset difference; (3) a difference between a mean value $C_{mean}(t)$ of the cross-correlation values between the reference signal and the frames of the microphone signal in the delay analysis range and the cross-correlation value C(t) corresponding to the current delay position is greater than a second preset difference; and (4) the current delay position p(t) is smaller than a previous delay position p(t−1).

In an embodiment, the method further includes: caching data of a historical reference signal; and shifting the cached data of the historical reference signal jointly when shifting the reference signal.

In an embodiment, the method further includes: if the current delay estimation value is less than a length of the adaptive filter, the updating the adaptive filter includes: shifting an adaptive filter coefficient based on the delay estimation value and updating the adaptive filter based on the shifted adaptive filter coefficient, where a coefficient at a position that has no corresponding coefficient value after the shifting is reset, and the adaptive filter is updated based on the reset coefficient value.

An echo cancellation apparatus based on delay estimation includes a signal processing module, a frequency point detecting module, a delay estimating module, a signal shifting module, and an adaptive filter. The signal processing module is configured to receive a microphone signal and a reference signal, preprocess the microphone signal and the reference signal, and output the preprocessed microphone signal and the preprocessed reference signal. The frequency point detecting module is configured to determine, in the preprocessed microphone signal and the preprocessed reference signal that are outputted by the signal processing module, frequency point signals with non-linearity in a current echo cancellation scenario. The delay estimating module is configured to calculate a current delay estimation value based on frequency point signals without non-linearity that are determined by the frequency point detecting module in the preprocessed microphone signal and the preprocessed reference signal, and output the current delay estimation value. The signal shifting module is configured to shift the reference signal based on the current delay estimation value outputted by the delay estimating module, and output the shifted reference signal. The adaptive filter is configured to update the adaptive filter based on the preprocessed microphone signal outputted by the signal processing module and the shifted reference signal outputted by the signal shifting module, to perform echo cancellation.

In an embodiment, the frequency point detecting module includes one or more of a far-end signal detecting unit, a dual-end signal detecting unit, and a device hardware detecting unit. The far-end signal detecting unit is configured to determine the frequency point signals with non-linearity based on one or more of energy, a zero-crossing rate, and a short-term amplitude of the preprocessed reference signal. The dual-end signal detecting unit configured to determine the frequency point signals with non-linearity based on a ratio of energy of the preprocessed microphone signal to energy of the preprocessed reference signal. The device hardware detecting unit is configured to: first determine a mean value of correlation between the reference signal and the microphone signal in a low frequency range, then calculate mean values of correlation between the reference signal and the microphone signal in other frequency ranges at a predetermined frequency interval, and finally determine the frequency point signals with non-linearity based on the mean values of correlation in the other frequency ranges and the mean value of correlation in the low frequency range.

In an embodiment, the delay estimating module includes a cross-correlation calculating unit and a delay estimation value determining unit. The cross-correlation calculating unit is configured to: for each of frames of the microphone signal in a delay analysis range, select frequency point signals without non-linearity in the reference signal and the frame of the microphone signal; and calculate a cross-correlation value between the reference signal and the frame of the microphone signal. The delay estimation value determining unit is configured to determine the delay estimation value based on calculated cross-correlation values between the reference signal and the frames of the microphone signal.

In an embodiment, the delay estimation value determining unit is configured to: select a position corresponding to a frame of the microphone signal with a maximum cross-correlation value among the cross-correlation values between the reference signal and the frames of the microphone signal calculated by the cross-correlation calculating unit as a current delay position; and determine the current delay estimation value based on the current delay position and a position of the reference signal.

In an embodiment, the delay estimation value determining unit is configured to: select, in each delay estimation, a position corresponding to a frame of the microphone signal with a maximum cross-correlation value among the calculated cross-correlation values between the reference signal and the frames of the microphone signal in the delay analysis range as a candidate delay position; map candidate delay positions into an L-dimensional array Sa, wherein L is equal to the total number of frames of the microphone signal in the delay analysis range, and count the number of times that a candidate delay position repeatedly appears; increase a value for a current candidate delay position by a first preset value t1, decrease a value for a previous candidate delay position by a second preset value t2, and decrease values for other positions by a third preset value t3, if the candidate delay position is changed; increase a value for the current candidate delay position by the first preset value t1, and decrease values for other positions by the third preset value t3, if the candidate delay position is not changed, wherein the second preset value t2 is less than or equal to the third preset value t3; and determine the current delay estimation value based on the current candidate delay position and a position of the reference signal, if the value for the current candidate delay position is greater than a first threshold and the number of times that the current candidate delay position repeatedly appears is greater than a second threshold.

In an embodiment, the signal shifting module is further configured to: not shift data of the reference signal in a case that the current delay estimation value $D_1(t)$ is less than or equal to a third threshold T3; shift the data of the reference signal by $D_1(t)/2$ in a case that the current delay estimation value $D_1(t)$ is greater than the third threshold T3 and less than a fourth threshold T4; and shift the data of the reference signal by $D_1(t)$ in a case that the current delay estimation value $D_1(t)$ is greater than or equal to the fourth threshold T4.

In an embodiment, the delay estimation value determining unit is configured to, in determining the delay estimation value, determine that one or more of the following conditions are met: (1) a cross-correlation value C(t) corresponding to a current delay position is greater than a cross-correlation value C(t−1) corresponding to a previous delay position; (2) for each frame in a current delay analysis range, a difference between a position corresponding to a maximum cross-correlation value $C_{max}(t)$ and a position corresponding to a minimum cross-correlation $C_{min}(t)$ is greater than a first preset difference; (3) a difference between a mean value $C_{mean}(t)$ of the cross-correlation values between the reference signal and the frames of the microphone signal in the delay analysis range and the cross-correlation value C(t) corresponding to the current delay position is greater than a second preset difference; and (4) the current delay position p(t) is smaller than a previous delay position p(t−1).

In an embodiment, the apparatus further includes a caching module. The caching module is configured to cache data of a historical reference signal. The signal shifting module is further configured to shift the cached data of the historical reference signal jointly when shifting the reference signal.

In an embodiment, the adaptive filter is configured to, in updating the adaptive filter, if the current delay estimation value is less than a length of the filter, shift an adaptive filter coefficient based on the delay estimation value and the update the adaptive filter based on the shifted adaptive filter coefficient, where a coefficient at a position that has no corresponding coefficient value after the shifting is reset and the adaptive filter is updated based on the reset coefficient value.

An echo cancellation device based on delay estimation includes a processor, a memory, and a system bus. The processor is connected to the memory via the system bus. The memory stores one or more programs including instructions that, when being executed by the processor, control the processor to perform any of the above echo cancellation methods based on delay estimation.

A computer-readable storage medium stores instructions that, when being executed by a terminal device, control the terminal device to perform any of the above echo cancellation methods based on delay estimation.

A computer program product, when being executed by a terminal device, controls the terminal device to perform any of the above echo cancellation methods based on delay estimation.

With the echo cancellation method and the echo cancellation apparatus according to the embodiments of the present disclosure, frequency points with non-linearity in the microphone signal and the reference signal are detected. A current delay estimation value is calculated based on frequency point signals without non-linearity in the microphone signal and the reference signal. That is, a delay between the reference signal and the microphone signal is estimated without non-linearity, so that the delay estimation value is more accurate. Then, the reference signal is shifted based on the current delay estimation value. The adaptive filter is updated based on the microphone signal and the shifted reference signal, to perform echo cancellation, thereby effectively improving the effect of echo cancellation.

Further, in the delay estimation, the delay estimation value is corrected based on various robust conditions, so that the estimated delay is more robust.

Further, in the process of updating the adaptive filter, by caching and shifting the data of the historical reference signal, and resetting a filter coefficient that has no reference value, a time period for re-convergence of the filter caused by a change of the delay can be reduced, thereby reducing an influence of re-convergence on performance of echo cancellation.

BRIEF DESCRIPTION OF THE DRAWINGS

In order to illustrate technical solutions more clearly in embodiments of the present disclosure or in the conventional technology, the drawings to be used in the embodiments are briefly described below. Apparently, the drawings in the following description show only certain embodiments of the present disclosure, and other drawings may be obtained by those skilled in the art from the drawings.

DETAILED DESCRIPTION OF EMBODIMENTS

Embodiments of the present disclosure are further described in detail below with reference to the accompanying drawings and implementations, so that those skilled in the art can better understand the technical solutions according to the embodiments of the present disclosure.

In practical applications, non-linearity often occurs in an echo cancellation process. Many cases, such as high sound volume, insufficient battery power, absence of far-end signal, i.e., absence of reference signal, and dual speech (i.e., both human sound and speaker sound are included), may result in non-linearity in an audio signal, which may cause an error of cross-correlation calculated for the delay estimation, and eventually result in poor quality of echo cancellation. In view of this, an echo cancellation method based on delay estimation and an echo cancellation apparatus based on delay estimation are provided according to the embodiments of the present disclosure. When determining a delay, frequency points with non-linearity are removed. A delay estimation value is determined based on frequency point signals without non-linearity in the microphone signal and the reference signal, so as to obtain a more accurate delay estimation value, thereby improving the echo cancellation performance.

Figure 1:
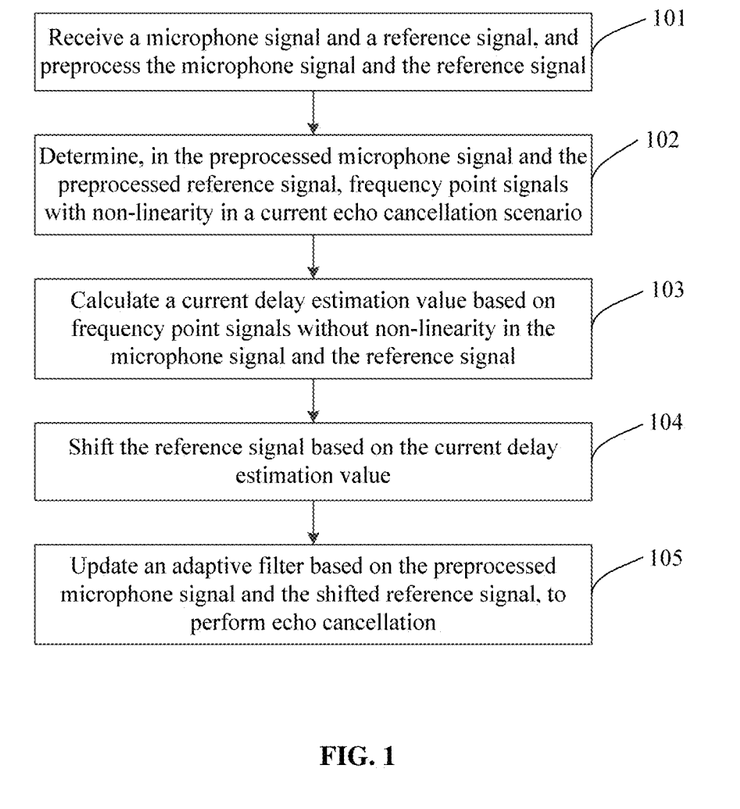
FIG. 1 is a flowchart of an echo cancellation method based on delay estimation according to an embodiment of the present disclosure.

Reference is made to FIG. 1, which is a flowchart of an echo cancellation method based on delay estimation according to an embodiment of the present disclosure. The method includes the following steps 101 to 105.

In step 101, a microphone signal and a reference signal are received and preprocessed.

The microphone signal is a digital signal acquired by a microphone for collecting a voice signal and subjected to A/D conversion. The reference signal is a source signal to be cancelled by the echo cancellation, which is also a digital signal. Taking a case that echo cancellation is performed on a television box as an example, for a manufacturer of the television box, the reference signal is a source signal transmitted by the television box to the television or a television speaker signal generally used in the conventional technology, which is not limited herein.

The preprocessing mainly includes framing, windowing, and fast Fourier transforming and the like, and is performed for transforming the reference signal and the microphone signal in a time domain into respective signals in a frequency domain.

In step 102, frequency point signals with non-linearity in the preprocessed microphone signal and the preprocessed reference signal in a current echo cancellation scenario are determined.

In view of diversity of actual application environments and device hardware, the following different detection methods may be used for determining the frequency point signals with non-linearity.

(1) Far-End Signal Detection

The frequency point signals with non-linearity are determined based on one or more of energy, a zero-crossing rate, and a short-term amplitude of the preprocessed reference signal. For example, if energy $P_x$ of a reference signal x at a frequency point is greater than a preset energy threshold, it is determined that non-linearity occurs in a frequency point signal at this frequency point.

(2) Dual-End Signal Detection

The frequency point signals with non-linearity are determined based on a ratio of energy of the preprocessed microphone signal to energy of the preprocessed reference signal.

Specifically, smoothing energy $\tilde{P}_x$ of the reference signal x at a frequency point and smoothing energy $\tilde{P}_y$ of the microphone signal at this frequency point are calculated. Determination is made based on an energy ratio $\tilde{P}_y/\tilde{P}_x$. If the energy ratio is greater than a preset energy ratio threshold, it is determined that non-linearity occurs in a frequency point signal at this frequency point. The smoothing energy $\tilde{P}_x$ and $\tilde{P}_y$ are calculated using the following equations:

$$\tilde{P}_x(n) = \alpha * \tilde{P}_x(n-1) + (1-\alpha) * |x(n)|^2 \quad (1.1)$$

$$\tilde{P}_y(n) = \alpha * \tilde{P}_y(n-1) + (1-\alpha) * |y(n)|^2 \quad (1.2)$$

where x(n) and y(n) respectively represent the reference signal and the microphone signal at a frequency n, and α is a smoothing coefficient and may be determined based on a large number of experimental results and/or experience.

Alternatively, energy of the reference signal x at a frequency point and energy of the microphone signal at the frequency point may be directly calculated. Determination is made based on an energy ratio of the energy of the reference signal x to the energy of the microphone signal. If the energy ratio is greater than the preset energy ratio threshold, it is determined that non-linearity occurs in a frequency point signal at this frequency point.

(3) Detection of Non-Linearity Caused by Device Hardware.

In practical applications, in order to reduce cost of the hardware device as much as possible, cheap hardware is often used, which may result in non-linearity in some operation states, such as excessive high speaker volume and insufficient battery power. The non-linearity may be detected as follows.

First, a mean value of cross-correlation between the reference signal and the microphone signal in a low frequency range N (for example, ranging from 300 HZ to 800 HZ, which may be determined based on experience and/or a large number of experimental results) is calculated.

At the frequency n, the cross-correlation value between the reference signal and the microphone signal is calculated from the following equation 1.3:

$$C(n) = \frac{\tilde{P}_{xy}(n)}{\tilde{P}_x(n) * \tilde{P}_y(n)} \quad (1.3)$$

where $\tilde{P}_{xy}(n) = \beta * \tilde{P}_{xy}(n-1) + (1-\beta) * |x(n)y(n)|^2$, β is a smoothing coefficient and may be determined based on a large number of experiments and/or experience.

Therefore, in the low frequency range N, the mean value of cross-correlation between the reference signal and the microphone signal may be calculated as follows:

$$\overline{C(n)} = \Sigma_n^N C(n)/N \quad (1.4)$$

Then, mean values cross-correlation between the reference signal and the microphone signal in other frequency ranges at a certain frequency interval d (1≤d<20) are calculated, by the same calculation method as that of the mean value of cross-correlation in the above low frequency range.

Finally, the frequency point signals with non-linearity are determined based on the mean values of cross-correlation in the other frequency ranges and the mean value cross-correlation in the low frequency range. For example, it is determined whether one of the mean values of correlation in the other frequency ranges is significantly less than the mean value of correlation in the low frequency range (for example, whether a ratio of the mean value of correlation in another frequency range to the mean value of correlation in the low frequency range is less than 0.1). If a mean value of correlation in another frequency range is significantly less than the mean value of correlation in the low frequency range, signals in the another frequency range may include non-linearity.

It should be noted that in practical applications, the determination may be made by using any one of the above detection methods, or combining any two or all three of the above detection methods. Further, in a case that multiple detection methods are used for comprehensive determination, values obtained by the multiple detection methods may be weighted. Alternatively, frequency point signals are determined as having non-linearity only when a result of each of the multiple detection methods indicates that the frequency point signals have non-linearity, which is not limited herein.

In step 103, a current delay estimation value is calculated based on frequency point signals without non-linearity in the microphone signal and the reference signal.

First, frames of the microphone signal included in a delay analysis range are determined. For example, in a case of a sampling rate of 16 KHZ and a maximum delay of 1 s, the delay analysis range is 30 frames. That is, a cross-correlation value between the reference signal and each of the 30 frames of the microphone signal is calculated in each delay analysis.

Then, for each of the frames of the microphone signal, frequency point signals without non-linearity in the reference signal and the frame of the microphone signal are selected, to calculate a cross-correlation value between the reference signal and the frame of the microphone signal.

Specifically, for a current frame, frequency point signals without non-linearity are selected. In a case of 512 frequency points (where a length of FFT interval is 1024), a cross-correlation value between the reference signal and the microphone signal at each of the 512 frequency points is calculated, referring to the above equation 1.3 for details.

After a cross-correlation value at each of the 512 frequency points is acquired, a mean value of cross-correlation at the 512 frequency points in the current frame is calculated. The mean value of cross-correlation serves as a cross-correlation value between the current frame of the reference signal and the current frame of the microphone signal.

It should be noted that in order to make the delay estimation based on cross-correlation more accurate, frequency points in a general audio frequency range (in a case of the sampling rate of 16 KHZ, the general audio frequency ranges from 1500 Hz to 4625 Hz) may be selected to calculate the cross-correlation value between the reference signal and the microphone signal. Further, in order to reduce the amount of calculation and improve efficiency, M (for example, M=100) frequency points in the general frequency range may be selected to calculate the cross-correlation value between the reference signal and the microphone signal.

Finally, the delay estimation value is determined based on the calculated cross-correlation values between the reference signal and the frames of the microphone signal.

In practical applications, the delay estimation value may be determined in various manners which are described separately below.

In a first example, a position corresponding to a frame of the microphone signal with a maximum cross-correlation value among the calculated cross-correlation values between the reference signal and the frames of the microphone signal is selected as a current delay position. The current delay estimation value is determined based on the current delay position and a position of the reference signal.

For example, the current frame of the reference signal is taken as a reference, which is assumed to be the $50^{th}$ frame, and there are 30 frames of the microphone signal in the delay analysis range, namely, the $20^{th}$ to $50^{th}$ frames of the microphone. Each of the 30 frames of the microphone signal is compared with the $50^{th}$ frame of the reference signal. If a cross-correlation value between the current $50^{th}$ frame of the reference signal and a $25^{th}$ frame of the microphone signal is maximum, the current delay estimation value is calculated as 50−25=25. As such, if a frame number of the reference signal is less than 30 (for example, 18), frames of the microphone signal to be compared are all frames before the current frame. That is, the $18^{th}$ frame of the reference signal is compared with each of $1^{th}$ to $18^{th}$ frames of the microphone signals.

In a second example, in order to make the current delay estimation value more robust, one or more of the following robust conditions may be satisfied. That is, after the frame with the largest cross-correlation value is obtained, it may further need to determine whether one or more of the following robust conditions are satisfied. If one or more of the following robust conditions are satisfied, the current delay estimation value is determined based on the current delay position and the position of the reference signal, and otherwise, a next delay estimation is performed.

The robust conditions include: (1) a cross-correlation value C(t) corresponding to a current delay position is greater than a cross-correlation value C(t−1) corresponding to a previous delay position; (2) for each frame in a current delay analysis range, a difference between a position corresponding to a maximum cross-correlation value $C_{max}(t)$ and a position corresponding to a minimum cross-correlation $C_{min}(t)$ is greater than a first preset difference; (3) a difference between a mean value $C_{mean}(t)$ of the cross-correlation values between the reference signal and the frames of the microphone signal in the delay analysis range and the cross-correlation value C(t) corresponding to the current delay position is greater than a second preset difference; and (4) the current delay position p(t) is smaller than a previous delay position p(t−1).

In a third example, in shifting the reference signal and updating the filter based on the delay, the delay estimation value needs to be more accurate as the filter converges. In order to acquire the delay more accurately, a position corresponding to the frame with a maximum cross-correlation value may serve as a candidate delay position in an embodiment. Based on historical data, the candidate delay position is penalized and/or rewarded according to a change of the candidate delay position, to finally acquire an accurate delay estimation value.

The delay estimation value is determined as follows.

First, a position corresponding to a frame of the microphone signal with a maximum cross-correlation value among the cross-correlation values between the reference signal and the frames of the microphone signal in the delay analysis range that are calculated in each delay estimation serves as a candidate delay position. Candidate delay positions are mapped into an L-dimensional array Sa, where L is equal to a total number of frames of the microphone signal in the delay analysis range. The number of times that a candidate delay position repeatedly appears is counted as "count". Once the continuity of the "count" is interrupted, "count" is set to 0.

If the current candidate delay position is changed, a value for the current candidate delay position is increased by a first preset value t1, a value for a previous candidate delay position is decreased by a second preset value t2, and values for the other positions are decreased by a third preset value t3.

If the current candidate delay position is not changed, credibility of the current candidate delay position increases, and credibility of the previously estimated candidate delay position and other positions is low. The value for the current candidate delay position is increased by the first preset value t1, and values for the other positions are decreased by the third preset value t3. Since the previous candidate delay position is more credible than the other positions, the previous candidate delay position is decreased by a relatively small value. Values of t1, t2, and t3 may be determined based on experience or a large number of experiments, and generally t3 is greater than or equal to t2. For example, t1, t2, and t3 may be set to 2, 1, and 2, respectively.

If the value of the current candidate delay position is greater than a first threshold T1 (for example, T1=10), and the number of times that the current candidate delay position repeatedly appears is greater than a second threshold T2 (for example, T2=4), it indicates that the estimated current candidate delay position is highly accurate, and can be used as an accurate delay $D_1(t)$.

In a fourth example, in order to make the current delay estimation value more robust, when determining the delay estimation value by the method in the third example, it is further determined whether one or more of the above robust conditions are satisfied. If one or more of the above robust conditions are satisfied, the current delay estimation value is determined based on the current delay position and the position of the reference signal, and otherwise a next delay estimation is performed.

In step 104, the reference signal is shifted based on the current delay estimation value.

In practical applications, data of the reference signal may be shifted by a delay estimation value determined by any one of different methods in the above first to fourth examples.

In addition, in a case that the current delay estimation value $D_1(t)$ is determined by the method in the third example or the fourth example, considering that the accuracy of an estimated candidate delay position varies with intervals, the reference signal may be shifted as follows.

In a case that the current delay estimation value $D_1(t)$ is less than or equal to a third threshold T3 (for example, T3=10), the data of the reference signal is not shifted.

In a case that the current delay estimation value $D_1(t)$ is greater than the third threshold T3 and less than a fourth threshold T4 (for example, T4=20), the data of the reference signal is shifted by $D_1(t)/2$.

In a case that the current delay estimation value $D_1(t)$ is greater than or equal to the fourth threshold T4, the data of the reference signal is shifted by $D_1(t)$.

In addition, in view of an existing problem of losing content of the historical reference signal when shifting the reference signal based on the delay, the data of the historical reference signal is shifted jointly with the shifting of the reference signal based on the current delay estimation value in another embodiment of the present disclosure. Specifically, the data of the historical reference signal is cached. The cached data of the historical reference signal is shifted jointly when shifting the reference signal.

Figure 2:
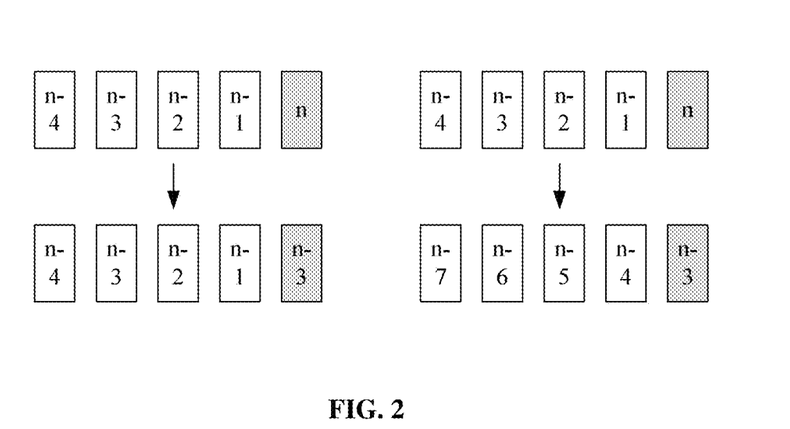
FIG. 2 is a schematic diagram showing a comparison between an embodiment of the present disclosure in which a historical reference signal is jointly shifted and the conventional technology in which only the current reference signal is shifted.

Reference is made to FIG. 2, which is a schematic diagram showing a comparison between the conventional technology and an embodiment of the present disclosure in which data of the historical reference signal is shifted jointly.

It can be seen from FIG. 2 that in the conventional technology, assuming a delay estimation value is equal to 3, data of the reference signal at a time point n is directly replaced with data of the reference signal data at a time point (n−3) in shifting the reference signal. However, data of the historical reference signal, for example, data of the reference signal at time points (n−1) to (n−4) in FIG. 2, remains unchanged, which may result in discontinuities in the signal. In the embodiment of the present disclosure, when shifting the reference signal, not only the data of the reference signal at the time point n is replaced with the data of the reference signal data at the time point (n−3), but also the data of the historical reference signal is shifted jointly, as shown in FIG. 2, thereby avoiding the influence on the effect of echo cancellation caused by the discontinuous signal, i.e., the loss of the content of the historical reference signal.

In step S105, an adaptive filter is updated based on the preprocessed microphone signal and the shifted reference signal, to perform echo cancellation.

Specifically, after the echo cancellation is performed based on a microphone signal y(t,n) and a shifted reference signal x'(t,n), an output signal is as follows:

$$e(t,n)=y(t,n)-h(t,n)*x'(t,n) \qquad (1.5)$$

where h(t,n) represents a filter coefficient.

The filter coefficient h(t,n) is updated as follows:

$$h(t,n)=h(t-1,n)+\gamma*e(t,n)*x'(t,n)/(x'(t,n)^2+\theta) \qquad (1.6)$$

where γ is a step size for updating the filter, which is determined based on a large number of experiments and/or experience, and θ is a regularization factor which is also generally determined based on a large number of experiments and/or experience.

Since the filter coefficient needs to be updated when the delay changes, in order to speed up updating of the filter coefficient and reduce the degradation in performance of the echo cancellation caused by updating the filter coefficient, in another embodiment of the present disclosure, if the current delay estimation value is less than a length of the filter, in updating the adaptive filter coefficient, the filter coefficient is shifted based on the delay estimation value and the filter is updated based on the shifted adaptive filter coefficient, where a coefficient at a position that has no corresponding value after the shifting is reset, for example, to 0. The update of the filter is based on the reset coefficient value, so as to shorten a time period for updating the filter coefficient.

Figure 3:
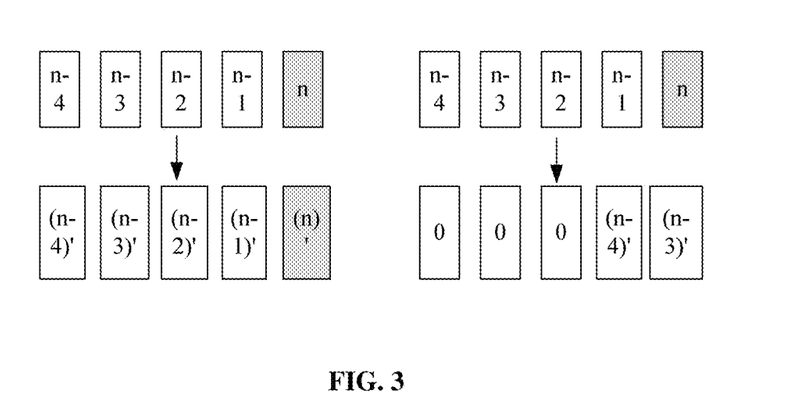
FIG. 3 is a schematic diagram showing a comparison between the conventional technology and an embodiment of the present disclosure in which an error filter coefficient is reset when updating the filter.

Reference is made to FIG. 3, it is a schematic diagram showing a comparison between the conventional technology and an embodiment of the present disclosure in which an error filter coefficient is reset to 0 when updating the filter.

It is assumed that the delay estimation value is equal to 3. A schematic diagram of updating the filter coefficient in the conventional technology is shown on the left part. It can be seen that in the conventional technology, all coefficients are updated based on a current value when updating the filter coefficient. A schematic diagram of updating the filter coefficient in the embodiment of the present disclosure is shown on the right part. It can be seen that an $n^{th}$ and $(n-1)^{th}$ filter coefficients are updated, and the other filter coefficients are updated by resetting to 0.

With the echo cancellation method according to the embodiments of the present disclosure, frequency points with non-linearity in the microphone signal and the reference signal are detected. A current delay estimation value is calculated based on frequency point signals without non-linearity in the microphone signal and the reference signal. That is, a delay between the reference signal and the microphone signal is estimated without non-linearity, so that the delay estimation value is more accurate. Then, the reference signal is shifted based on the current delay estimation value. The adaptive filter is updated based on the microphone signal and the shifted reference signal, to perform echo cancellation, thereby effectively improving the effect of echo cancellation.

Further, in the delay estimation, the delay estimation value is corrected based on various robust conditions, so that the estimated delay is more robust.

Further, in the process of updating the adaptive filter, by caching and jointly shifting the data of the historical reference signal, and resetting a filter coefficient that has no reference significance, a time period for re-convergence of the filter caused by a change of the delay can be reduced, thereby reducing an influence of re-convergence on performance of echo cancellation.

Figure 4:
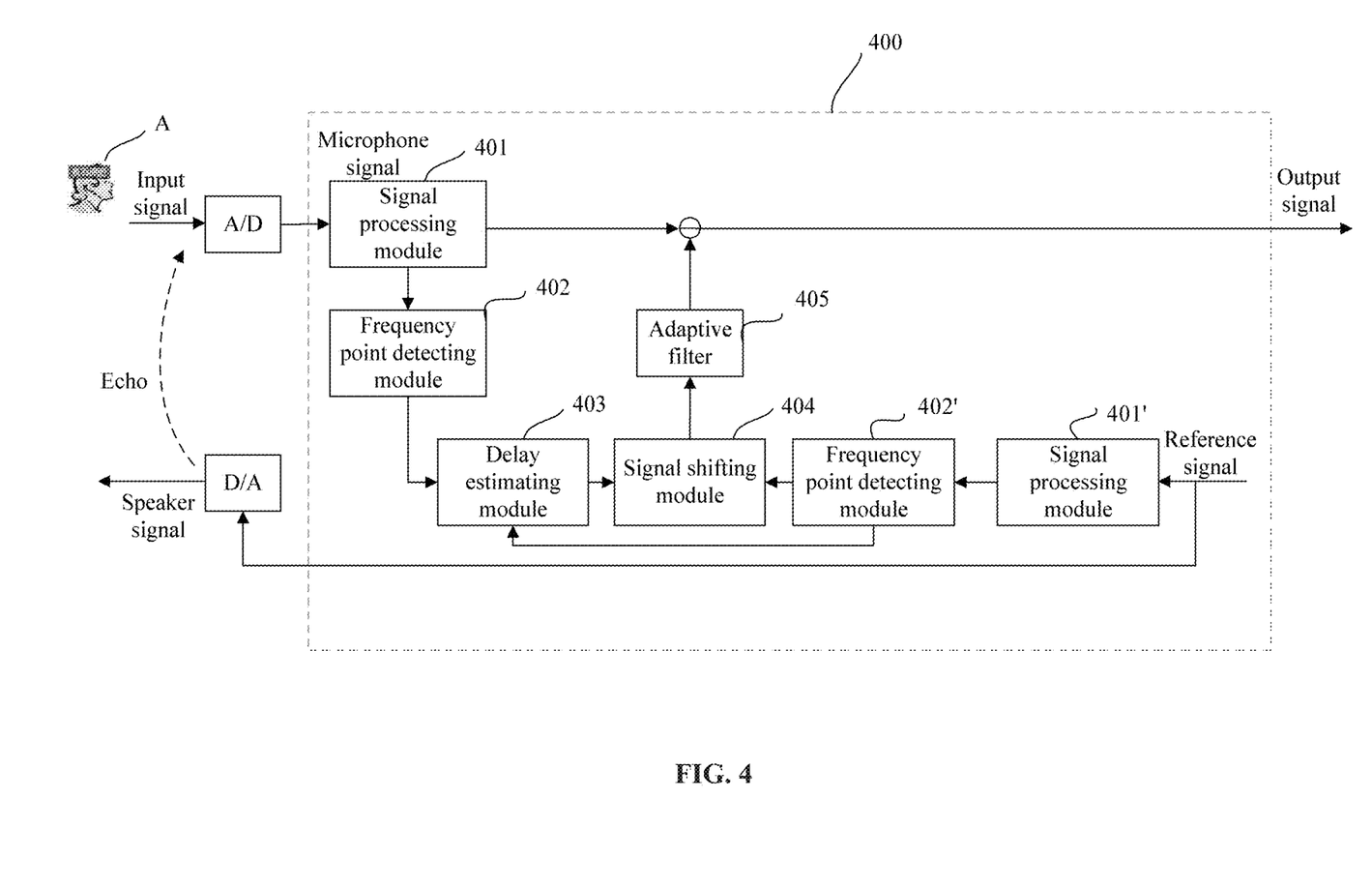
FIG. 4 is a schematic block diagram of an echo cancellation apparatus based on delay estimation according to an embodiment of the present disclosure.

Accordingly, an echo cancellation apparatus based on delay estimation is further provided according to an embodiment of the present disclosure. Reference is made to FIG. 4, it is a schematic block diagram of the apparatus.

FIG. 4 shows an example that echo cancellation is performed on a television box. The reference signal is a source signal transmitted by the television box to a television or a television speaker signal generally used in the conventional technology. A signal collected by a microphone of the television box serves as the microphone signal. User A controls the television box by voice.

An input signal in FIG. 4 includes an echo signal from a speaker. The input signal is subjected to A/D conversion, and the converted digital signal is transmitted to the echo cancellation apparatus 400 based on delay estimation according to the embodiment of the present disclosure. The echo cancellation apparatus 400 cancels the echo signal in the input signal to obtain an output signal, namely, a sound signal of the user A. The television box analyzes the output signal to obtain a control instruction of the user A.

The echo cancellation apparatus 400 based on delay estimation according to this embodiment includes signal processing modules 401 and 401', frequency point detecting modules 402 and 402', a delay estimating module 403, a signal shifting module 404, and an adaptive filter 405.

The signal processing modules 401 and 401' are respectively configured to receive a microphone signal and a reference signal, preprocess the microphone signal and the reference signal, and output the preprocessed microphone signal and the preprocessed reference signal. The preprocessing mainly includes framing, windowing, and fast Fourier transforming and the like, and is performed for transforming the reference signal and the microphone signal in a time domain into respective signals in a frequency domain.

The frequency point detecting modules 402 and 402' are respectively configured to determine, in the preprocessed microphone signal and the preprocessed reference signal that are outputted by the signal processing modules, frequency point signals with non-linearity in a current echo cancellation scenario.

The delay estimating module 403 is configured to calculate a current delay estimation value based on frequency point signals without non-linearity that are determined by the frequency point detecting modules in the preprocessed microphone signal and the preprocessed reference signal, and output the current delay estimation value.

The signal shifting module 404 is configured to shift the reference signal based on the current delay estimation value outputted by the delay estimating module, and output the shifted reference signal.

The adaptive filter 405 is configured to update the adaptive filter based on the preprocessed microphone signal outputted by the signal processing module and the shifted reference signal outputted by the signal shifting module 404, to perform echo cancellation.

It should be noted that in FIG. 4, the signal processing module 401 and the signal processing module 401', as well as the frequency point detecting module 402 and the frequency point detecting module 402' are described merely for convenience of understanding the principle of the apparatus according to the present disclosure. In practical applications, the signal processing module 401 and the signal processing module 401' may be integrated into a same physical entity. Similarly, the frequency point detecting module 402 and the frequency point detecting module 402' may be integrated into a same physical entity. Further, the signal processing modules and the frequency point detecting modules may be integrated into a same physical entity, which is not limited herein.

FIG. 4 shows only an application example of the apparatus according to the present disclosure. It should be noted that the apparatus according to the embodiment of the present disclosure may be applicable to various scenarios. For example, in a scenario that a television box controls a television, the apparatus according to the present disclosure is integrated in the television box, so as to effectively cancel a sound played by the television from a control sound for the television. Other scenarios are not enumerated herein.

In view of the diversity of actual application environments and device hardware, different detection methods may be used when determining frequency point signals with non-linearity. Accordingly, the above frequency point detecting module may include one or more of the following detecting units of a far-end signal detecting unit, a dual-end signal detecting unit, and a device hardware detecting unit, to detect frequency point signals with non-linearity in different conditions.

The far-end signal detecting unit is configured to determine the frequency point signals with non-linearity based on one or more of energy, a zero-crossing rate, and a short-term amplitude of the preprocessed reference signal. For example, if energy $P_x$ of a reference signal x at a frequency point is greater than a preset energy threshold, it is determined that non-linearity occurs in a frequency point signal at this frequency point.

The dual-end signal detecting unit is configured to determine the frequency point signals with non-linearity based on a ratio of energy of the preprocessed microphone signal to energy of the preprocessed reference signal. One may refer to the description of the above method embodiments for details, which is not repeated herein.

The device hardware detecting unit is configured to: first determine a mean value of correlation between the reference signal and the microphone signal in a low frequency range, then calculate mean values of correlation between the reference signal and the microphone signal in other frequency ranges at a predetermined frequency interval, and finally determine the frequency point signals with non-linearity based on the mean values of correlation in the other frequency ranges and the mean value of correlation in the low frequency range. For example, if a mean value of correlation in another frequency range is significantly smaller than the mean value of correlation in the low frequency range, signals in the another frequency range include non-linearity.

The delay estimating module 403 includes a cross-correlation calculating unit and a delay estimation value determining unit. The cross-correlation calculating unit is configured to: for each of frames of the microphone signal in a delay analysis range, select frequency point signals without non-linearity in the reference signal and the frame of the microphone signal; and calculate a cross-correlation value between the reference signal and the frame of the microphone signal. The delay estimation value determining unit is configured to determine the delay estimation value based on cross-correlation values between the reference signal and the frames of the microphone signal that are calculated by the cross-correlation calculating unit.

For example, the delay estimation value determining unit may be configured to: select a position corresponding to a frame of the microphone signal with a maximum cross-correlation value among the cross-correlation values between the reference signal and the frames of the microphone signal calculated by the cross-correlation calculating unit as a current delay position; and determine the current delay estimation value based on the current delay position and a position of the reference signal.

Further, in order to make the current delay estimation value more robust, in determining the current delay estimation value, the delay estimation value determining unit may further determine whether one or more of the following robust conditions are satisfied. If one or more of the following robust conditions are satisfied, the current delay estimation value is determined based on the current delay position and the position of the reference signal, and otherwise a next delay estimation is performed.

The robust conditions include: (1) a cross-correlation value C(t) corresponding to a current delay position is greater than a cross-correlation value C(t−1) corresponding to a previous delay position; (2) for each frame in a current delay analysis range, a difference between a position corresponding to a maximum cross-correlation value $C_{max}(t)$ and a position corresponding to a minimum cross-correlation $C_{min}(t)$ is greater than a first preset difference; (3) a difference between a mean value $C_{mean}(t)$ of the cross-correlation values between the reference signal and the frames of the microphone signal in the delay analysis range and the cross-correlation value C(t) corresponding to the current delay position is greater than a second preset difference; and (4) the current delay position p(t) is smaller than a previous delay position p(t−1).

Further, in a case that the reference signal is shifted and the filter is updated based on the delay, the delay estimation value is required to be increasingly accurate with the convergence of the filter. In order to acquire the delay more accurately, the delay estimation value determining unit may select the position corresponding to the frame with a maximum cross-correlation value as the candidate delay position. Based on historical data, the candidate delay position is penalized and/or rewarded according to a change of the candidate delay position, to finally acquire an accurate delay estimation value. Specifically, a position corresponding to a frame of the microphone signal with the largest cross-correlation value among the cross-correlation values between the reference signal and the frames of the microphone signal in the delay analysis range that are calculated in each delay estimation serves as the candidate delay position. Candidate delay positions are mapped into an L-dimensional array Sa, where L is equal to a total number of frames of the microphone signal in the delay analysis range. The number of times that a candidate delay position repeatedly appears is counted. If the current candidate delay position is changed, a value for the current candidate delay position is increased by a first preset value t1, a value for a previous candidate delay position is decreased by a second preset value t2, and values for the other positions are decreased by a third preset value t3. If the current candidate delay position is not changed, the value for the current candidate delay position is increased by the first preset value t1, and values for the other positions are decreased by the third preset value t3. The second preset value t2 is less than or equal to the third preset value t3. If the value of the current candidate delay position is greater than a first threshold, and the number of times that the current candidate delay position repeatedly appears is greater than a second threshold, the current delay estimation value is determined based on the current candidate delay position and the position of the reference signal. Value of t1, t2, and t3 may be determined based on experience or a large number of experiments, and generally t3 is greater than or equal to t2. For example, t1, t2, and t3 may be set to 2, 1, and 2.

It should be noted that, in determining the delay estimation value in the above manner, the delay estimation value determining unit may further determine whether one or more of the above robust conditions are satisfied, so that the current estimated delay value is more robust.

In practical applications, the signal shifting module 404 may shift the data of the reference signal by the current delay estimation value determined by the delay estimation value determining unit in any of the different manners.

Further, in the above case that based on the historical data, the candidate delay position is punished and/or rewarded according to the change of the candidate delay position to finally acquire the delay estimation value, and the accuracy of an estimated candidate delay position varies with intervals. Therefore, the signal shifting module 404 may shift the reference signal as follows. In a case that the current delay estimation value $D_1(t)$ is less than or equal to a third threshold T3, the data of the reference signal is not shifted. In a case that the current delay estimation value $D_1(t)$ is greater than the third threshold T3 and less than a fourth threshold T4, the data of the reference signal is shifted by $D_1(t)/2$. In a case that the current delay estimation value $D_1(t)$ is greater than or equal to the fourth threshold T4, the data of the reference signal is shifted by $D_1(t)$.

Figure 5:
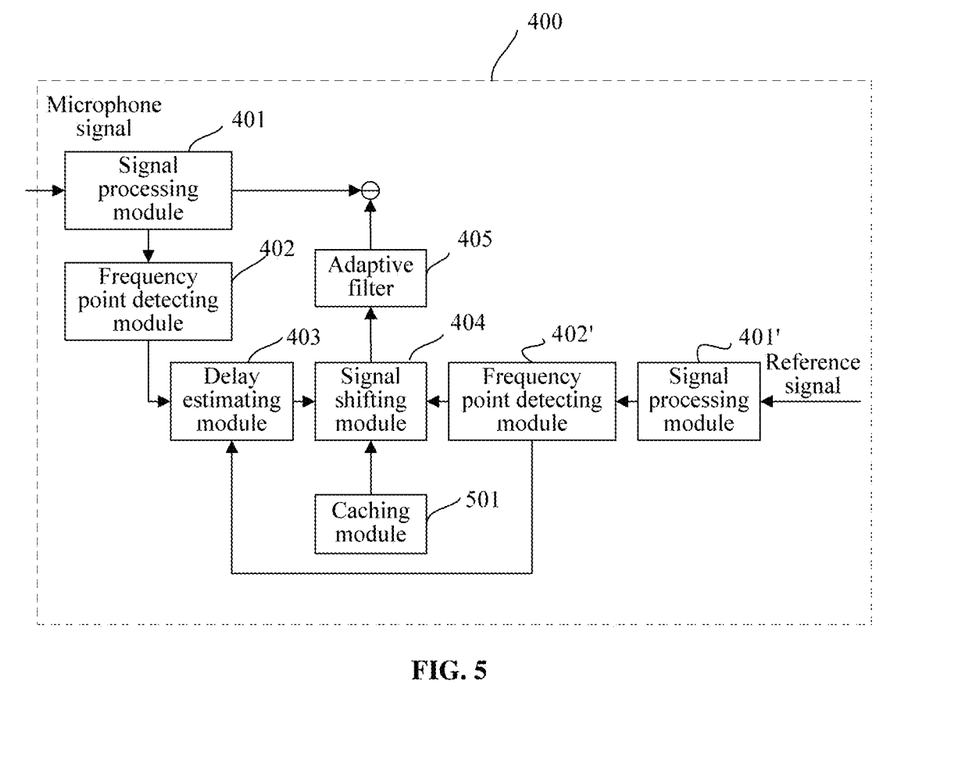
FIG. 5 is a schematic block diagram of an echo cancellation apparatus based on delay estimation according to another embodiment of the present disclosure.

In addition, in order to avoid losing of the content of the historical reference signal when shifting the reference signal, as shown in FIG. 5, the apparatus further includes a caching module 501 according to another embodiment of the present disclosure. The caching module is configured to cache data of a historical reference signal.

Accordingly, in this embodiment, the signal shifting module 404 is further configured to shift the cached data of the historical reference signal jointly when shifting the reference signal.

In another embodiment of the apparatus according to the present disclosure, when the adaptive filter 405 updates the coefficient, if the current delay estimation value is less than a length of the filter, the filter coefficient is shifted based on the delay estimation value and the filter is updated based on the shifted adaptive filter coefficient, where a coefficient at a position that has no value after the shifting is reset. For example, those filter coefficients having no reference significance are reset to 0. Then the filter is updated based on the reset adaptive filter coefficient.

With the echo cancellation apparatus according to the embodiments of the present disclosure, frequency points with non-linearity in the microphone signal and the reference signal are detected. A current delay estimation value is calculated based on frequency point signals without non-linearity in the microphone signal and the reference signal. As such, a delay between the reference signal and the microphone signal is estimated without non-linearity, so that the delay estimation value is more accurate. Then, the reference signal is shifted based on the current delay estimation value. The adaptive filter is updated based on the microphone signal and the shifted reference signal, to perform echo cancellation, thereby effectively improving the effect of echo cancellation.

Further, in the delay estimation, the delay estimation value is corrected based on various robust conditions, so that the estimated delay is more robust.

Further, in the process of updating the adaptive filter, by caching and jointly shifting the data of the historical reference signal, and resetting a filter coefficient that has no reference significance, a time period for re-convergence of the filter caused by a change of the delay can be reduced, thereby reducing an influence of re-convergence on performance of echo cancellation.

An echo cancellation device based on delay estimation is further provided according to an embodiment of the present disclosure. The device includes a processor, a memory, and a system bus.

The processor is connected to the memory via the system bus.

The memory stores one or more programs including instructions that, when being executed by the processor, control the processor to perform any of the above echo cancellation methods based on delay estimation.

A computer-readable storage medium is further provided according to an embodiment of the present disclosure. The computer-readable storage medium stores instructions that, when being executed by a terminal device, control the terminal device to perform any of the above echo cancellation methods based on delay estimation.

A computer program product is further provided according to an embodiment of the present disclosure. The computer program product, when being executed by a terminal device, controls the terminal device to perform any of the above echo cancellation methods based on delay estimation.

The embodiments in this specification are described in a progressive way, each of which emphasizes the differences from others, and the same or similar parts among the embodiments can be referred to each other. Further, the apparatus embodiments described above are only illustrative. The above units described as separate components may be or may be not separated physically. A component displayed as a unit may be or may be not a physical unit, that is, may be located at one place or may be distributed on multiple network units. The object of the solutions of the embodiment may be achieved by selecting a part or all of the units based on actual requirements. Those skilled in the art can understand and implement the technical solution of the present disclosure without creative efforts.

The embodiments of the present disclosure are described in detail above. The present disclosure is illustrated by specific embodiments. The above description of the embodiments is only for facilitating understanding of the method and the apparatus according to the present disclosure. Further, those skilled in the art may change the specific implementation and the application scope based on an idea of the present disclosure. In summary, this description should not be understood as a limitation on the present disclosure.

The invention claimed is:

1. An echo cancellation method based on delay estimation, comprising:
   receiving a microphone signal and a reference signal, and preprocessing the microphone signal and the reference signal;
   determining, in the preprocessed microphone signal and the preprocessed reference signal, frequency point signals with non-linearity in a current echo cancellation scenario;
   calculating a current delay estimation value based on frequency point signals without non-linearity in the microphone signal and the reference signal;
   shifting the reference signal based on the current delay estimation value; and
   updating an adaptive filter based on the preprocessed microphone signal and the shifted reference signal, to perform echo cancellation.

2. The method according to claim 1, wherein the determining, in the preprocessed microphone signal and the preprocessed reference signal, frequency point signals with non-linearity in a current echo cancellation scenario comprises one or more of:
   a far-end signal detection, comprising determining the frequency point signals with non-linearity based on one or more of energy, a zero-crossing rate, and a short-term amplitude of the preprocessed reference signal;
   a dual-end signal detection, comprising determining the frequency point signals with non-linearity based on a ratio of energy of the preprocessed microphone signal to energy of the preprocessed reference signal; and
   a detection of non-linearity caused by device hardware, comprising first calculating a mean value of correlation between the reference signal and the microphone signal in a low frequency range, then calculating mean values of correlation between the reference signal and the microphone signal in other frequency ranges at a predetermined frequency interval, and finally determining the frequency point signals with non-linearity based on the mean values of correlation in the other frequency ranges and the mean value of correlation in the low frequency range.

3. The method according to claim 1, wherein the calculating a current delay estimation value based on frequency point signals without non-linearity in the microphone signal and the reference signal comprises:
   for each of frames of the microphone signal in a delay analysis range, selecting frequency point signals without non-linearity in the reference signal and the frame of the microphone signal, and calculating a cross-correlation value between the reference signal and the frame of the microphone signal; and
   determining the delay estimation value based on calculated cross-correlation values between the reference signal and the frames of the microphone signal.

4. The method according to claim 3, wherein the determining the delay estimation value based on calculated cross-correlation values between the reference signal and the frames of the microphone signal comprises:
   selecting a position corresponding to a frame of the microphone signal with a maximum cross-correlation value among the calculated cross-correlation values between the reference signal and the frames of the microphone signal, as a current delay position; and determining the current delay estimation value based on the current delay position and a position of the reference signal.

5. The method according to claim 3, wherein the determining the current delay estimation value based on calculated cross-correlation values between the reference signal and the frames of the microphone signal comprises:

selecting, in each delay estimation, a position corresponding to a frame of the microphone signal with a maximum cross-correlation value among the calculated cross-correlation values between the reference signal and the frames of the microphone signal in the delay analysis range as a candidate delay position; and mapping candidate delay positions into an L-dimensional array Sa, wherein L is equal to a total number of frames of the microphone signal in the delay analysis range, and counting the number of times that a candidate delay position continuously repeats;

increasing a value for a current candidate delay position by a first preset value t1, decreasing a value for a previous candidate delay position by a second preset value t2, and decreasing values for other positions by a third preset value t3, if the current candidate delay position is changed;

increasing the value for the current candidate delay position by the first preset value t1, and decreasing values for other positions by the third preset value t3, if the current candidate delay position is not changed, wherein the second preset value t2 is less than or equal to the third preset value t3; and determining the current delay estimation value based on the current candidate delay position and a position of the reference signal, if the value for the current candidate delay position is greater than a first threshold and the number of times that the current candidate delay position continuously repeats is greater than a second threshold.

6. The method according to claim 5, wherein the shifting the reference signal based on the current delay estimation value comprises:

not shifting data of the reference signal in a case that the current delay estimation value $D_1(t)$ is less than or equal to a third threshold T3;

shifting the data of the reference signal by $D_1(t)/2$ in a case that the current delay estimation value $D_1(t)$ is greater than the third threshold T3 and less than a fourth threshold T4; and shifting the data of the reference signal by $D_1(t)$ in a case that the current delay estimation value $D_1(t)$ is greater than or equal to the fourth threshold T4.

7. The method according to claim 4, wherein the determining the delay estimation value based on calculated cross-correlation values between the reference signal and the frames of the microphone signal comprises determining that one or more of the following conditions are met:

(1) a cross-correlation value C(t) corresponding to a current delay position is greater than a cross-correlation value C(t−1) corresponding to a previous delay position;

(2) for each frame in a current delay analysis range, a difference between a position corresponding to a maximum cross-correlation value $C_{max}(t)$ and a position corresponding to a minimum cross-correlation $C_{min}(t)$ is greater than a first preset difference;

(3) a difference between a mean value $C_{mean}(t)$ of the cross-correlation values between the reference signal and the frames of the microphone signal in the delay analysis range and the cross-correlation value C(t) corresponding to the current delay position is greater than a second preset difference; and (4) the current delay position p(t) is smaller than a previous delay position p(t−1).

8. The method according to claim 1, further comprising:
caching data of a historical reference signal; and
shifting the cached data of the historical reference signal jointly when shifting the reference signal.

9. The method according to claim 1, wherein
if the current delay estimation value is less than a length of the adaptive filter, the updating the adaptive filter comprises:

shifting an adaptive filter coefficient based on the delay estimation value and updating the adaptive filter based on the shifted adaptive filter coefficient, wherein a coefficient at a position that has no value after the shifting is reset, and the adaptive filter is updated based on the reset adaptive filter coefficient.

10. A non-transitory computer-readable storage medium, storing instructions that, when being executed by a terminal device, control the terminal device to perform the method according to claim 1.

11. An echo cancellation apparatus based on delay estimation, comprising:

a signal processing module, configured to receive a microphone signal and a reference signal, preprocess the microphone signal and the reference signal, and output the preprocessed microphone signal and the preprocessed reference signal;

a frequency point detecting module, configured to determine, in the preprocessed microphone signal and the preprocessed reference signal that are outputted by the signal processing module, frequency point signals with non-linearity in a current echo cancellation scenario;

a delay estimating module, configured to calculate a current delay estimation value based on frequency point signals without non-linearity that are determined by the frequency point detecting module in the preprocessed microphone signal and the preprocessed reference signal, and output the current delay estimation value;

a signal shifting module configured to shift the reference signal based on the current delay estimation value outputted by the delay estimating module, and output the shifted reference signal; and an adaptive filter configured to update the adaptive filter based on the preprocessed microphone signal outputted by the signal processing module and the shifted reference signal outputted by the signal shifting module, to perform echo cancellation.

12. The apparatus according to claim 11, wherein the frequency point detecting module comprises one or more of:

a far-end signal detecting unit, configured to determine the frequency point signals with non-linearity based on one or more of energy, a zero-crossing rate, and a short-term amplitude of the preprocessed reference signal;

a dual-end signal detecting unit, configured to determine the frequency point signals with non-linearity based on a ratio of energy of the preprocessed microphone signal to energy of the preprocessed reference signal; and a device hardware detecting unit, configured to: first determine a mean value of correlation between the reference signal and the microphone signal in a low frequency range, then calculate mean values of correlation between the reference signal and the microphone signal in other frequency ranges at a certain frequency interval, and finally determine the frequency point signals with non-linearity based on the mean values of correlation in the other frequency ranges and the mean value of correlation in the low frequency range.

13. The apparatus according to claim 11, wherein the delay estimating module comprises:
a cross-correlation calculating unit, configured to: for each of frames of the microphone signal in a delay analysis range, select frequency point signals without non-linearity in the reference signal and the frame of the microphone signal; and calculate a cross-correlation value between the reference signal and the frame of the microphone signal; and
a delay estimation value determining unit, configured to determine the delay estimation value based on calculated cross-correlation values between the reference signal and the frames of the microphone signal.

14. The apparatus according to claim 13, wherein the delay estimation value determining unit is configured to:
select a position corresponding to a frame of the microphone signal with a maximum cross-correlation value among the cross-correlation values between the reference signal and the frames of the microphone signal calculated by the cross-correlation calculating unit as a current delay position; and
determine the current delay estimation value based on the current delay position and a position of the reference signal.

15. The apparatus according to claim 13, wherein the delay estimation value determining unit is configured to:
select, in each delay estimation, a position corresponding to a frame of the microphone signal with a maximum cross-correlation value among the calculated cross-correlation values between the reference signal and the frames of the microphone signal in the delay analysis range as a candidate delay position; map candidate delay positions into an L-dimensional array Sa, wherein L is equal to the total number of frames of the microphone signal in the delay analysis range, and count the number of times that a candidate delay position continuously repeats;
increase a value for a current candidate delay position by a first preset value t1, decrease a value for a previous candidate delay position by a second preset value t2, and decrease values for other positions by a third preset value t3, if the current candidate delay position is changed;
increase the value for the current candidate delay position by the first preset value t1, and decrease values for other positions by the third preset value t3, if the current candidate delay position is not changed, wherein the second preset value t2 is less than or equal to the third preset value t3; and determine the current delay estimation value based on the current candidate delay position and a position of the reference signal, if the value for the current candidate delay position is greater than a first threshold and the number of times that the current candidate delay position continuously repeats is greater than a second threshold.

16. The apparatus according to claim 15, wherein the signal shifting module is configured to:
not shift data of the reference signal in a case that the current delay estimation value $D_1(t)$ is less than or equal to a third threshold T3;
shift the data of the reference signal by $D_1(t)/2$ in a case that the current delay estimation value $D_1(t)$ is greater than the third threshold T3 and less than a fourth threshold T4; and
shift the data of the reference signal by $D_1(t)$ in a case that the current delay estimation value $D_1(t)$ is greater than or equal to the fourth threshold T4.

17. The apparatus according to claim 14, wherein the delay estimation value determining unit is configured to, in determining the delay estimation value, determine that one or more of the following conditions are met:
(1) a cross-correlation value C(t) corresponding to a current delay position is greater than a cross-correlation value C(t−1) corresponding to a previous delay position;
(2) for each frame in a current delay analysis range, a difference between a position corresponding to a maximum cross-correlation value $C_{max}(t)$ and a position corresponding to a minimum cross-correlation $C_{min}(t)$ is greater than a first preset difference;
(3) a difference between a mean value $C_{mean}(t)$ of the cross-correlation values between the reference signal and the frames of the microphone signal in the delay analysis range and the cross-correlation value C(t) corresponding to the current delay position is greater than a second preset difference; and
(4) the current delay position p(t) is smaller than a previous delay position p(t−1).

18. The apparatus according to claim 11, further comprising:
a caching module configured to cache data of a historical reference signal, wherein the signal shifting module is further configured to shift the cached data of the historical reference signal jointly when shifting the reference signal.

19. The apparatus according to claim 11, wherein
the adaptive filter is configured to, in updating the adaptive filter, if the current delay estimation value is less than a length of the filter, shift an adaptive filter coefficient based on the delay estimation value and update the adaptive filter based on the shifted adaptive filter coefficient, wherein a coefficient at a position that has no value after the shifting is reset and the adaptive filter is updated based on the reset adaptive filter coefficient.

* * * * *